(12) United States Patent
Majidi-Ahy

(10) Patent No.: US 7,158,784 B1
(45) Date of Patent: Jan. 2, 2007

(54) ROBUST TOPOLOGY WIRELESS COMMUNICATION USING BROADBAND ACCESS POINTS

(75) Inventor: Reza Majidi-Ahy, Los Altos, CA (US)

(73) Assignee: Aperto Networks, Inc., Milpitas, CA (US)

(*) Notice: Subject to any disclaimer, the term of this patent is extended or adjusted under 35 U.S.C. 154(b) by 0 days.

(21) Appl. No.: 09/540,674

(22) Filed: Mar. 31, 2000

(51) Int. Cl.
*H04Q 7/20* (2006.01)

(52) U.S. Cl. .................. 455/426.1; 455/445; 455/560; 370/216

(58) Field of Classification Search ................ 455/426, 455/437, 436, 438, 439, 442, 441, 444, 525, 455/13.1, 500, 504, 501, 63, 61, 67.3, 278.1, 455/283, 296, 11.1, 426.1, 445, 560; 370/338, 370/328, 317, 216, 219
See application file for complete search history.

(56) References Cited

U.S. PATENT DOCUMENTS

| | | | |
|---|---|---|---|
| 5,243,595 A * | 9/1993 | Woest et al. ............... | 370/469 |
| 5,479,400 A | 12/1995 | Dilworth et al. | |
| 5,546,397 A | 8/1996 | Mahany | |
| 5,553,316 A | 9/1996 | Diepstraten et al. | |
| 5,592,491 A * | 1/1997 | Dinkins ...................... | 370/277 |
| 5,657,325 A | 8/1997 | Lou et al. | |
| 5,850,593 A * | 12/1998 | Uratani ...................... | 455/11.1 |
| 5,883,884 A * | 3/1999 | Atkinson .................... | 370/279 |
| 5,896,373 A * | 4/1999 | Mitts et al. ................. | 370/329 |
| 5,907,555 A | 5/1999 | Raith | |
| 5,918,176 A | 6/1999 | Arrington, Jr. et al. | |
| 5,926,761 A | 7/1999 | Reed et al. | |
| 5,945,948 A * | 8/1999 | Buford et al. .............. | 342/457 |
| 5,991,345 A * | 11/1999 | Ramasastry ................. | 370/320 |
| 6,006,073 A | 12/1999 | Glauner et al. | |
| 6,049,533 A * | 4/2000 | Norman et al. ............. | 370/328 |
| 6,122,513 A * | 9/2000 | Bassirat ...................... | 455/443 |
| 6,141,533 A * | 10/2000 | Wilson et al. ............. | 455/11.1 |
| 6,212,387 B1 * | 4/2001 | McLaughlin et al. ....... | 455/137 |
| 6,246,861 B1 * | 6/2001 | Messier et al. ............. | 370/330 |
| 6,292,651 B1 * | 9/2001 | Dapper et al. .............. | 370/342 |

(Continued)

FOREIGN PATENT DOCUMENTS

AU 2001249666 B2 10/2001

(Continued)

OTHER PUBLICATIONS

Seyhan Civanlar and Bharat T. Doshi. "Self-Healing in Wideband Packet Networks". IEEE Network vol. 4 (Jan. 1990) No. 1, New York, pp. 35-39. XP 000113853.

(Continued)

*Primary Examiner*—Joseph Feild
*Assistant Examiner*—S. Smith
(74) *Attorney, Agent, or Firm*—Swernofsky Law Group PC

(57) ABSTRACT

The invention provides a method and system for robust topology wireless communication using access points. A wireless communication system includes a communication cell having a base station controller and at least one set of customer premises equipment. The customer premises equipment is disposed within a sector of the cell, and communication between the base station controller and the customer premises equipment is controlled by the base station controller is so as to prevent interference between multiple sets of customer premises equipment. When customer premises equipment is subject to relatively larger amounts of multipath effect, or interference or noise, one or more access points are disposed within the sector, so as to propagate or route communication between the base station controller and one or more sets of customer premises equipment. The access points may range in complexity from simple reflectors, to repeaters, to routing devices operative within the cell.

19 Claims, 5 Drawing Sheets

U.S. PATENT DOCUMENTS

| | | | |
|---|---|---|---|
| 6,317,594 B1 * | 11/2001 | Gossman et al. | 455/414 |
| 6,353,729 B1 * | 3/2002 | Bassirat | 455/11.1 |
| 6,584,089 B1 * | 6/2003 | Honkasalo et al. | 370/338 |
| 6,603,753 B1 * | 8/2003 | Bedekar et al. | 370/335 |

FOREIGN PATENT DOCUMENTS

| | | |
|---|---|---|
| DE | 197 28 469 A1 | 7/1999 |
| WO | WO 97/17768 A1 | 5/1997 |
| WO | WO 98/59523 A2 | 12/1998 |
| WO | WO 98/59523 A3 | 12/1998 |
| WO | WO 99/01959 A2 | 1/1999 |
| WO | WO 99/14975 A2 | 3/1999 |
| WO | WO 99/14975 A3 | 3/1999 |
| WO | WO 99/23844 A2 | 5/1999 |
| WO | WO 99/23844 A3 | 5/1999 |
| WO | WO 99/44341 A1 | 9/1999 |
| WO | WO 01/50633 A1 | 7/2001 |
| WO | WO 01/50669 A1 | 7/2001 |
| WO | WO 01/76289 A2 | 10/2001 |
| WO | WO 01/76289 A3 | 10/2001 |
| WO | WO 02/13447 A2 | 2/2002 |
| WO | WO 02/25856 A2 | 3/2002 |

OTHER PUBLICATIONS

Information Sciences Institute. "DARPA Internet Program Protocol Specification," Sep. 1981, pp. 1-45, Information Sciences Institute, University of Southern California, Marina del Rey, USA.

* cited by examiner

ROBUST TOPOLOGY WIRELESS COMMUNICATION USING BROADBAND ACCESS POINTS

BACKGROUND OF THE INVENTION

Field of the Invention

This invention relates to robust topology wireless communication using access points.

Wireless communication between a sender and a receiver includes sending information using a wireless communication link, in which the sender modulates information onto a wireless communication channel (such as a frequency band reserved for wireless communication between the sender and the receiver), and the receiver demodulates that information from the wireless communication channel, so as to recover the original information.

One problem with known systems is that wireless communication channels are subject to several communication problems that make them relatively unreliable in comparison to wireline communication channels. Among these communication problems are interference, random or pseudo random noise, and multi-path effects. For a first example, a wireless communication channel can be subject to information sent on other wireless communication channels having nearby frequencies or other similar modulation formats. For a second example, a wireless communication channel can be subject to random or pseudo random noise, such as might be generated by ambient noise sources. For a third example, the information sent on a wireless communication channel can be reflected or refracted so as to arrive at its destination at more than one time and with varying degrees of attenuation. Of course, a most serious communication problem involves complete lack of communication between sender and receiver due to an obstruction on the line of sight path between sender and receiver.

One known method to account for these communication problems is to attempt to determine the nature of the communication problems likely to plague the wireless communication channel between a selected sender and receiver, and to attempt to reverse the effects of these communication problems. For a first example, the effects of interference and noise can be alleviated in part by error correcting codes and other known techniques of communication using noisy channels. For a second example, multi-path effects can be alleviated in part by attempting to determine an impulse response of the wireless communication link, and to invert that impulse response at either the sender or the receiver, so as to cancel those multi-path effects in the signal eventually presented to the receiver.

Although these known methods generally achieve the result of improving communication on wireless communication links, they are subject to several drawbacks. First, these known methods are severely limited in their ability to provide wireless communication to locations not reachable by point to point links, such as locations behind obstructions like buildings or mountains, or locations at nodes in an interference or reflection pattern at the selected communication frequency. Second, these known methods are severely degraded with increases in interference or noise (of any kind), and can at best achieve communication capability associated with a noiseless communication link. Moreover, none of these known methods achieve the capability of solving the problem of complete lack of communication between sender and receiver due to an obstruction on the line of sight path between sender and receiver.

Accordingly, it would be advantageous to provide a technique for wireless communication, such as for use in a wireless communication system, that is not subject to drawbacks of the known art.

SUMMARY OF THE INVENTION

The invention provides a method and system for robust topology wireless communication using access points. In a preferred embodiment, a wireless communication system includes a communication cell having a base station controller and at least one set of customer premises equipment. The customer premises equipment is disposed within a sector of the cell, and communication between the base station controller and the customer premises equipment is controlled by the base station controller is so as to prevent interference between multiple sets of customer premises equipment. When customer premises equipment is subject to relatively larger amounts of interference or noise, one or more access points are disposed within the sector, so as to propagate or route communication between the base station controller and one or more sets of customer premises equipment. In aspects of the invention described herein, the access points may range in complexity from simple reflectors, to repeaters, to routing devices operative within the cell.

The invention provides an enabling technology for a wide variety of applications for wireless communication, so as to obtain substantial advantages and capabilities that are novel and non-obvious in view of the known art. Examples described below primarily relate to cellular wireless communication systems, but the invention is broadly applicable to many different types of wireless and other communication systems.

DETAILED DESCRIPTION OF THE PREFERRED EMBODIMENT

Figure 1:
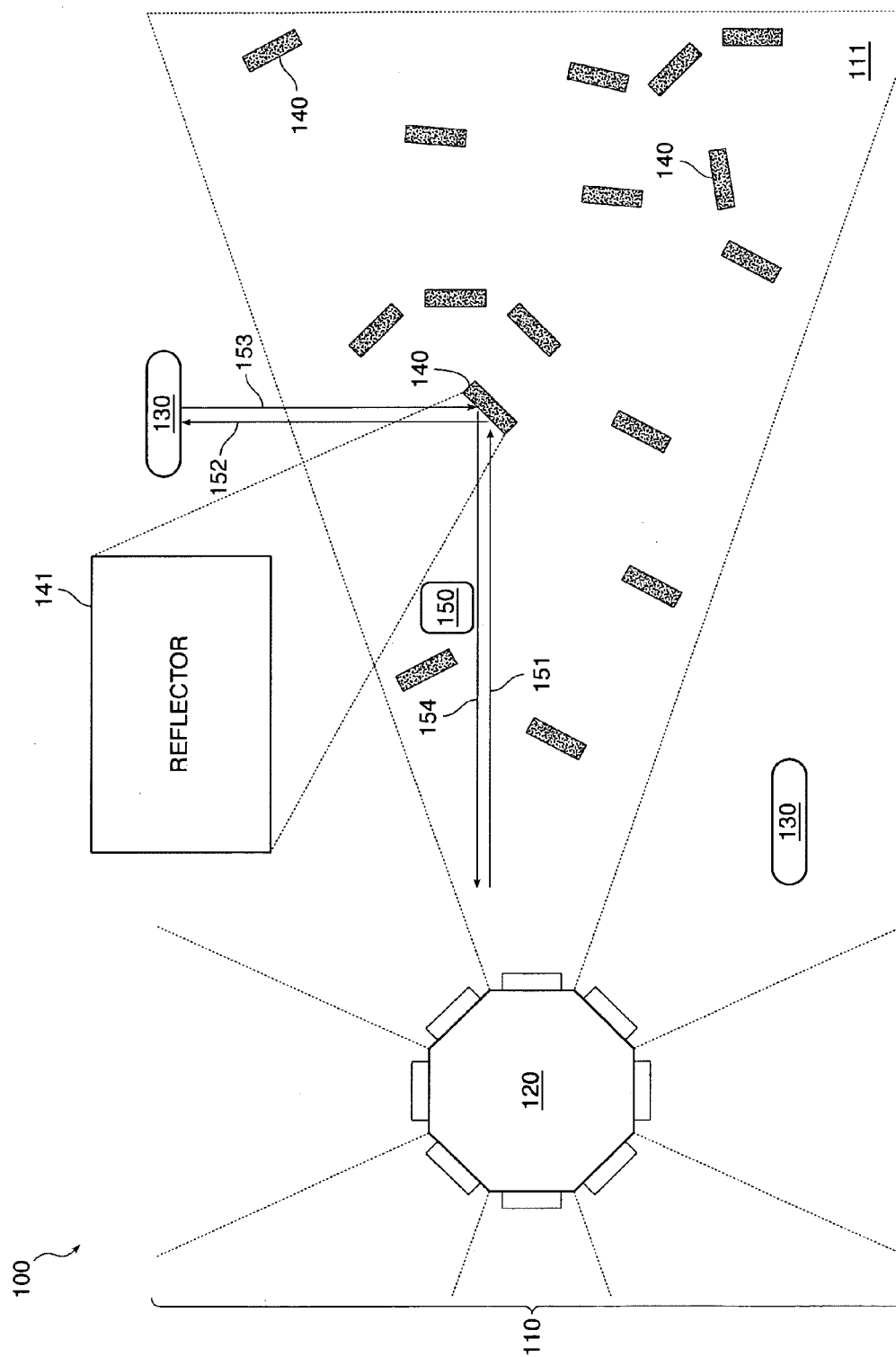
FIG. 1 shows a first block diagram of a system for wireless communication using robust topology.

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

RELATED APPLICATIONS

Inventions described herein can be used in conjunction with inventions described in the following documents.

U.S. patent application Ser. No. 09/475,642, Express Mail Mailing No. EL524 780 018 US, filed Dec. 30, 1999, in the name of of Varma, Subir, Ngo, Khuong, Fuentes, Jean, Truong, Paul, and Majidi-Ahy, Reza, titled "Adaptive Link Layer for Point to Multipoint Communication System."

U.S. patent application Ser. No. 09/475,716, Express Mail Mailing No. EL 524 780 021 US, filed Dec. 30, 1999, in the name of Majidi-Ahy, Reza, Hakim, Joseph, and Varma, Subir, titled "Integrated Self-Optimizing Multi-Parameter and Multi-Variable Point to MultiPoint Communication System."

Each of these documents is hereby incorporated by reference as if fully set forth herein. These documents are sometimes collectively referred to herein as the "Incorporated Disclosures."

Lexicography

The following terms refer or relate to aspects of the invention as described below. The descriptions of general meanings of these terms are not intended to be limiting, only illustrative.

access point in general, a device for performing message forwarding (either passively or actively) within a wireless communication cell. There is no particular requirement that an access point must be a single device; in alternative embodiments, the access points can each include a portion of a single device, a combination of multiple devices, or some hybrid thereof. Access points are sometimes referred to herein as "broadband" access points, to indicate their generic ability to handle broadband communication instead of, or in addition to, narrowband communcation.

base station controller—in general, a device for performing coordination and control for a wireless communication cell. There is no particular requirement that the base station controller must be a single device; in alternative embodiments, the base station controller can include a portion of a single device, a combination of multiple devices, or some hybrid thereof.

cell—in general, a region associated with a base station controller in which customer premises equipment communicate with the base station controller and in which the base station controller exercises control over communication parameters. Although in a preferred embodiment, cells are each contiguous and compact, there is no particular requirement for either property; cells may include non-contiguous sub-regions and are not necessarily compact.

communication link—in general, an element for sending information from a sender to a recipient. Although in a preferred embodiment the communication links referred to are generally wireless line of sight point-to-point communication links, there is no particular requirement that they are so restricted.

customer premises equipment—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof.

MAC parameters—in general, with reference to a wireless communication link, a set of characteristics or parameters relating to media access control of a communication link. For example, MAC parameters can include (a) a number of payload data bytes assigned per message, (b) a frequency of acknowledgement messages and a number of message retransmission attempts, (c) a fraction of the communication link allocated to downstream versus upstream communication, and the like.

physical parameters—in general, with reference to a wireless communication link, a set of characteristics or parameters relating to physical transmission of information on a communication link. For example, physical characteristics can include (a) a symbol transmission rate, (b) a number of payload data bits assigned per symbol, (c) a number of error detection or correction bits assigned per symbol, and the like.

propagate or route—in general, to forward a message from a sender toward a destination using an intermediate point, such as an intermediate reflector, repeater, or routing or switching element sector—in general, a portion of a cell that is not the entire cell. For example, a cell can be divided into multiple sectors in response to an angle of direction or a distance from the base station controller. There is no particular requirement that sectors must be disjoint; they may be overlapping.

wireless communication system—in general, a communication system including at least one communication link that uses wireless communication techniques.

wireless transport layer—in general, a set of protocols and protocol parameters for sending and receiving information using wireless transport. In a preferred embodiment, the wireless transport layer is part of a multilayer systems architecture, in which the wireless transport layer is built using a physical transport layer, and the wireless transport layer is used by a logical transport layer such as IP.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Context

A system using point to multipoint wireless communication in a wireless communication system operates as part of a system in which devices coupled to a network (such as a computer network) send messages, route and switch messages, and receive messages. In a preferred embodiment, devices coupled to (and integrated with) the network send, route, and receive these messages as sequences of packets, each of which has a header including delivery information and a payload including data. In a preferred embodiment, packet format conforms to the OSI model, in which relatively higher-level protocols such as an application protocol (layer 5, such as FTP), use relatively lower-level protocols such as a transport protocol (layer 4, such as TCP), which uses a network protocol (layer 3, such as IP), which uses a media access control (MAC) protocol (layer 2), which uses a physical transport technique (layer 1). In a preferred embodiment, packet format conforms to the OSI model, in which relatively lower-level protocols use higher-level protocols to recover from communication difficulties.

The system for wireless communication using robust topology is described herein with regard to layer 1 and layer 2, particularly as it applies to interactions between layer 1 and layer 2 and between those layers and layer 3. However, concepts and techniques of the invention are also applicable to other layers of the OSI model. Adapting those concepts and techniques to such other layers would not require undue experimentation or further invention, and is within the scope and spirit of the invention.

System Elements

FIG. 1 shows a first block diagram of a system for wireless communication using robust topology.

A system 100 includes a wireless communication cell 110, a base station controller 120, and one or more sets of customer premises equipment 130. The system 100 also includes a set of more than one sector 111 within the cell 110, a set of zero or more access points 140 within each sector 111, and a set of packets 150 sent among the elements of the system 100.

The wireless communication cell 110 includes a generally hexagon-shaped region of local surface area, such as might be found in a metropolitan region. Use of generally hexagon-shaped regions is known in the art of wireless communication because they are able to tile a local region with substantially no gaps. However, although in a preferred embodiment the wireless communication cell 110 includes a generally hexagon-shaped region, there is no particular requirement for using that particular shape; in alternative embodiments it may be useful to provide another shape or tiling of the local surface area.

The base station controller 120 includes a processor, program and data memory, mass storage, and one or more antennas for sending or receiving information using wireless communication techniques.

Similar to the base station controller 120, each set of customer premises equipment 130 includes a processor, program and data memory, mass storage, and one or more antennas for sending or receiving information using wireless communication techniques.

Communication among devices within the wireless communication cell 110 is conducted on one-to-one basis between each set of customer premises equipment 130 and the base station controller 120. Thus, the base station controller 120 communicates with each set of customer premises equipment 130, and each set of customer premises equipment 130 communicates with the base station controller 120. Customer premises equipment 130 do not communicate directly with other customer premises equipment 130.

Communication between the base station controller 120 and each set of customer premises equipment 130 is conducted using a time division duplex technique, in which time duration is are divided into individual frames, each one of which includes a "downstream" portion and an "upstream" portion. Unlike existing protocols in which transmissions are controlled by the transmitting side, the base station controller 120 controls tranmissions for both upstream and downstream directions, without specific requests from the customer premises equipment 130.

During the downstream portion of each frame, the base station controller 120 transmits, thus sending information to one or more sets of customer premises equipment 130. During the upstream portion of each frame, the base station controller automatically allocates slots for upstream re-transmission. This occurs in the absence of an explicit request for a slot from the customer premises equipment 130. Particular aspects of each frame are described in the Incorporated Disclosures. Time division duplex techniques are known in the art of wireless communication.

Access Points 1

In a first block diagram shown in FIG. 1, each access point 140 includes a reflector 141. Reflectors are known in the art of wireless communication.

Each packet 150 sent from the base station controller 120 to the customer premises equipment 130 can be sent line-of-sight to an access point 140, which can include a reflector 141, rather than line-of-sight from the base station controller 120 to the customer premises equipment 130. The reflector 141 at the access point 140 causes the electromagnetic signal carrying the packet 150 to be reflected from a first outbound path 151 to a second outbound path 152, so that the packet 150 reaches the customer premises equipment 130 in better form than using a line-of-sight path between the base station controller 120 to the customer premises equipment 130.

Similarly, each packet 150 sent from the customer premises equipment 130 to the base station controller 120 can be sent line-of-sight to an access point 140, which can include a reflector 141, rather than line-of-sight from the customer premises equipment 130 to the base station controller 120. The reflector 141 at the access point 140 causes the electromagnetic signal carrying the packet 150 to be reflected from a first inbound path 153 to a second inbound path 154, so that the packet 150 reaches the base station controller 120 in better form than using a line-of-sight path between the customer premises equipment 130 to the base station controller 120.

Access Points 2

Figure 2:
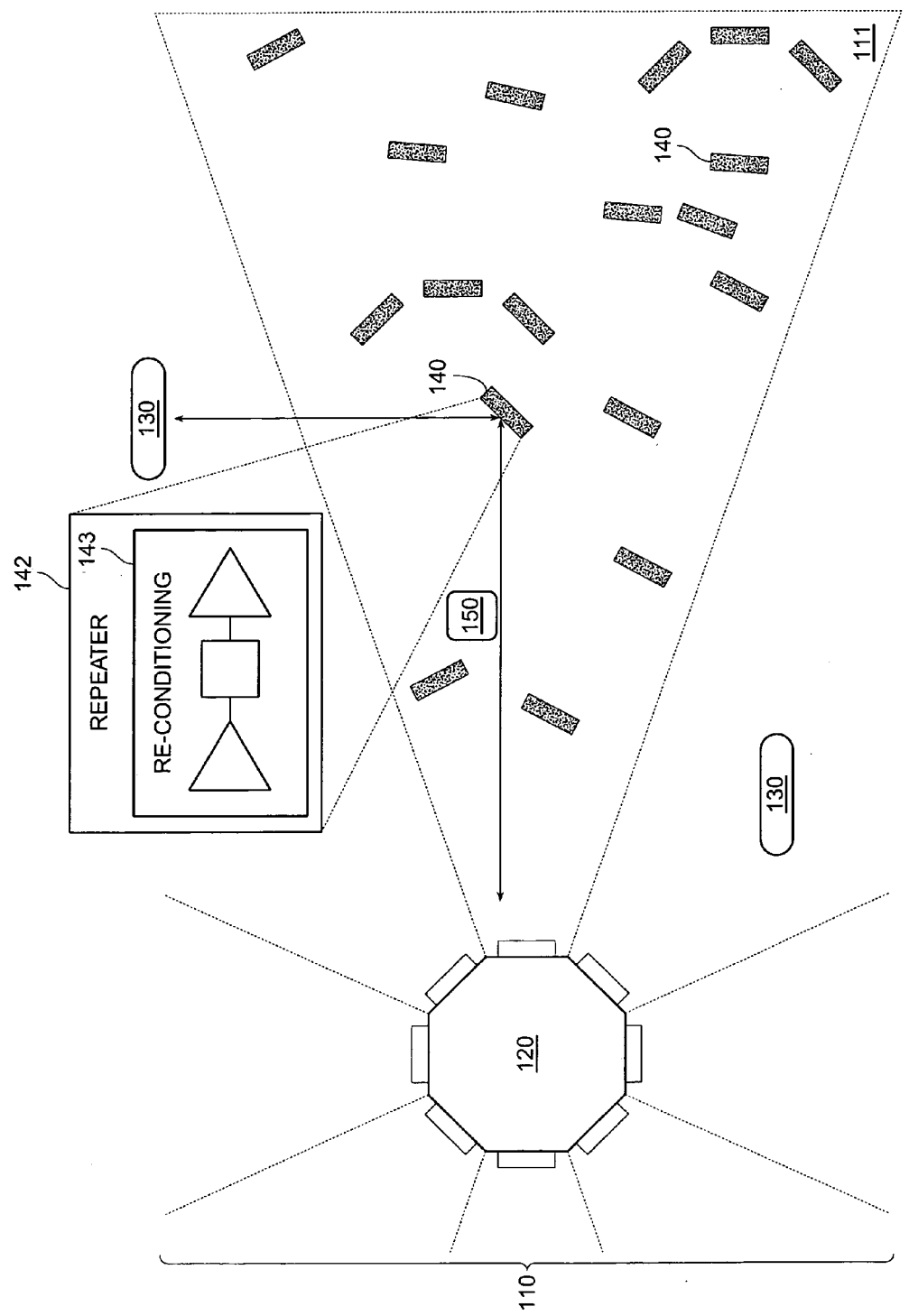
FIG. 2 shows a second block diagram of a system for wireless communication using robust topology.

FIG. 2 shows a second block diagram of a system for wireless communication using robust topology.

In a second block diagram shown in FIG. 2, each access point 140 includes a repeater 142. Repeaters are known in the art of wireless communication. Each repeater 142 includes a reconditioning element 143, such as including amplifiers and noise-removal circuits.

Similar to access points 140 including reflectors 141, each packet 150 sent from the base station controller 120 to the customer premises equipment 130 can be sent line-of-sight to an access point 140, rather than line-of-sight from the base station controller 120 to the customer premises equipment 130. At the access point 140, the packet 150 is received, reconditioned (for example, noise is reduced and the signal is re-amplified), and resent from the access point 140 to the destination customer premises equipment 130, so that the packet 150 reaches the customer premises equipment 130 in better form than using a non-reconditioned path between the base station controller 120 and the customer premises equipment 130.

Similarly, access points 140 using repeaters 142 can also be used for sending packets from the customer premises equipment 130 to the base station controller 120.

Access points 140 can include both reflectors 141 and repeaters 142, and can include combinations thereof, so that a packet 150 can sent line-of-sight to an access point 140, reconditioned at that access point 140 using a repeater 142 or variant thereof, and resent line-of-sight to its destination (either the base station controller 120 or the customer premises equipment 130).

Access Points 3

Figure 3:
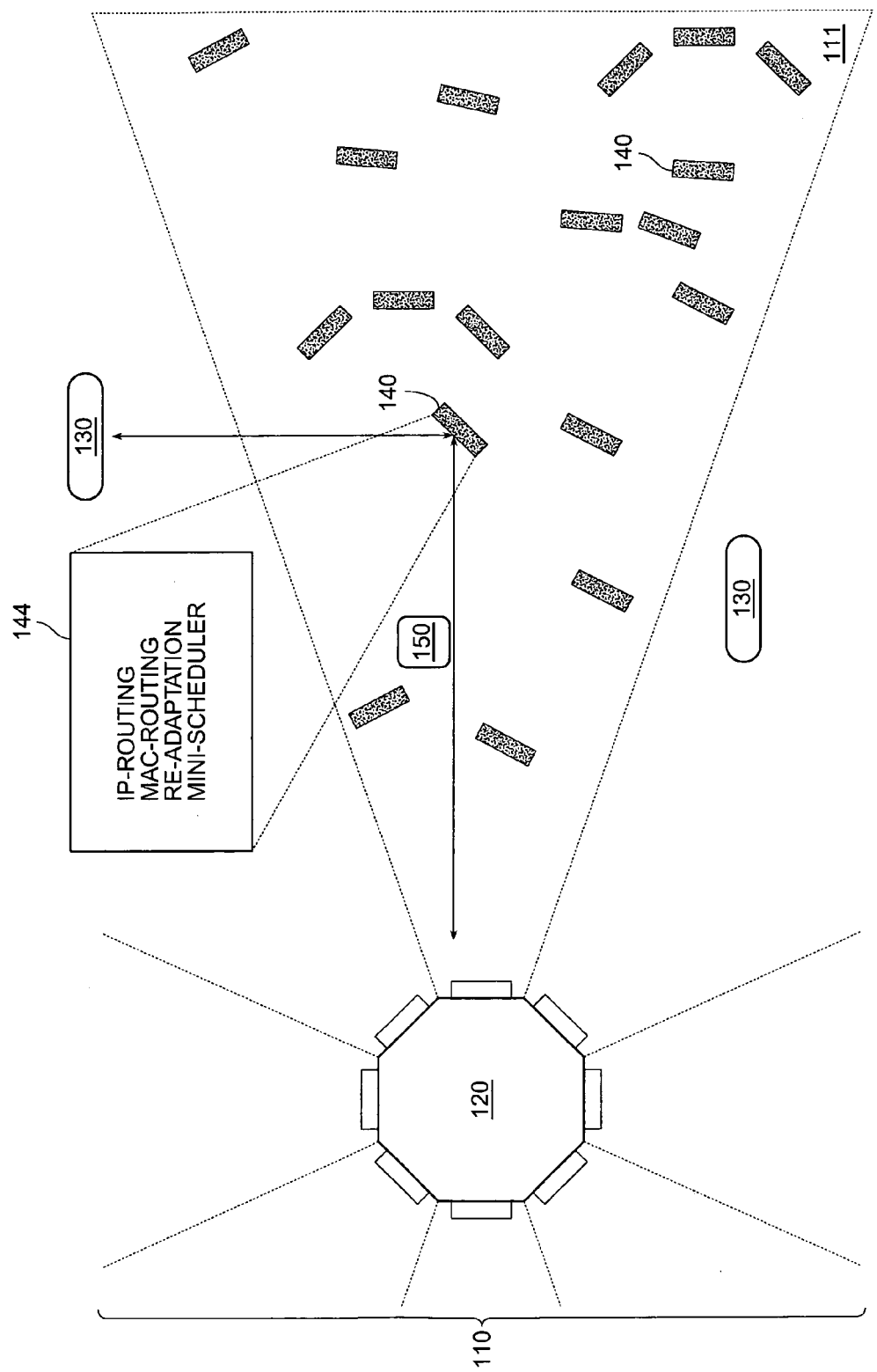
FIG. 3 shows a third block diagram of a system for wireless communication using robust topology.

FIG. 3 shows a third block diagram of a system for wireless communication using robust topology.

In a third block diagram shown in FIG. 3, each access point 140 includes a routing or switching device 143 operative within a sector 111 or within a cell 110. Routing or switching devices 143 are known in the art of communication networks.

Similar to access points 140 including reflectors 141, each packet 150 sent from the base station controller 120 to the customer premises equipment 130 can be sent line-of-sight to an access point 140, rather than line-of-sight from the base station controller 120 to the customer premises equipment 130. At the access point 140, the packet 150 is received, routed (for example, the destination customer premises equipment 130 is determined and the packet 150 is resent line-of-sight to that destination customer premises equipment 130), and resent from the access point 140 to the destination customer premises equipment 130, so that the packet 150 reaches the customer premises equipment 130 in better form than using a non-routed path between the base station controller 120 and the customer premises equipment 130.

Similarly, access points 140 using routing or switching devices 143 can also be used for sending packets from the customer premises equipment 130 to the base station controller 120.

Access points 140 can include any one of reflectors 141, repeaters 142, and routing or switching devices 143, and can include combinations thereof, so that a packet 150 can sent line-of-sight to an access point 140, routed or switched at that access point 140 using a routing or switching device 143 or variant thereof, reconditioned at that access point 140 using a repeater 142 or variant thereof, and resent line-of-sight to its destination (either the base station controller 120 or the customer premises equipment 130).

Moreover, routing or switching devices 143 can be used to enforce restrictions on communication between the base station controller 120 and the customer premises equipment 130, using either ACL (access control list) restrictions, QoS (quality of service) restrictions, or other restrictions known in the art of communication networks. Those skilled in the art will find, after perusal of this application, that the possibility of enforcing such restrictions is part of the scope and spirit of the invention, and would not require undue experimentation or further invention.

Access Points 4

Figure 4:
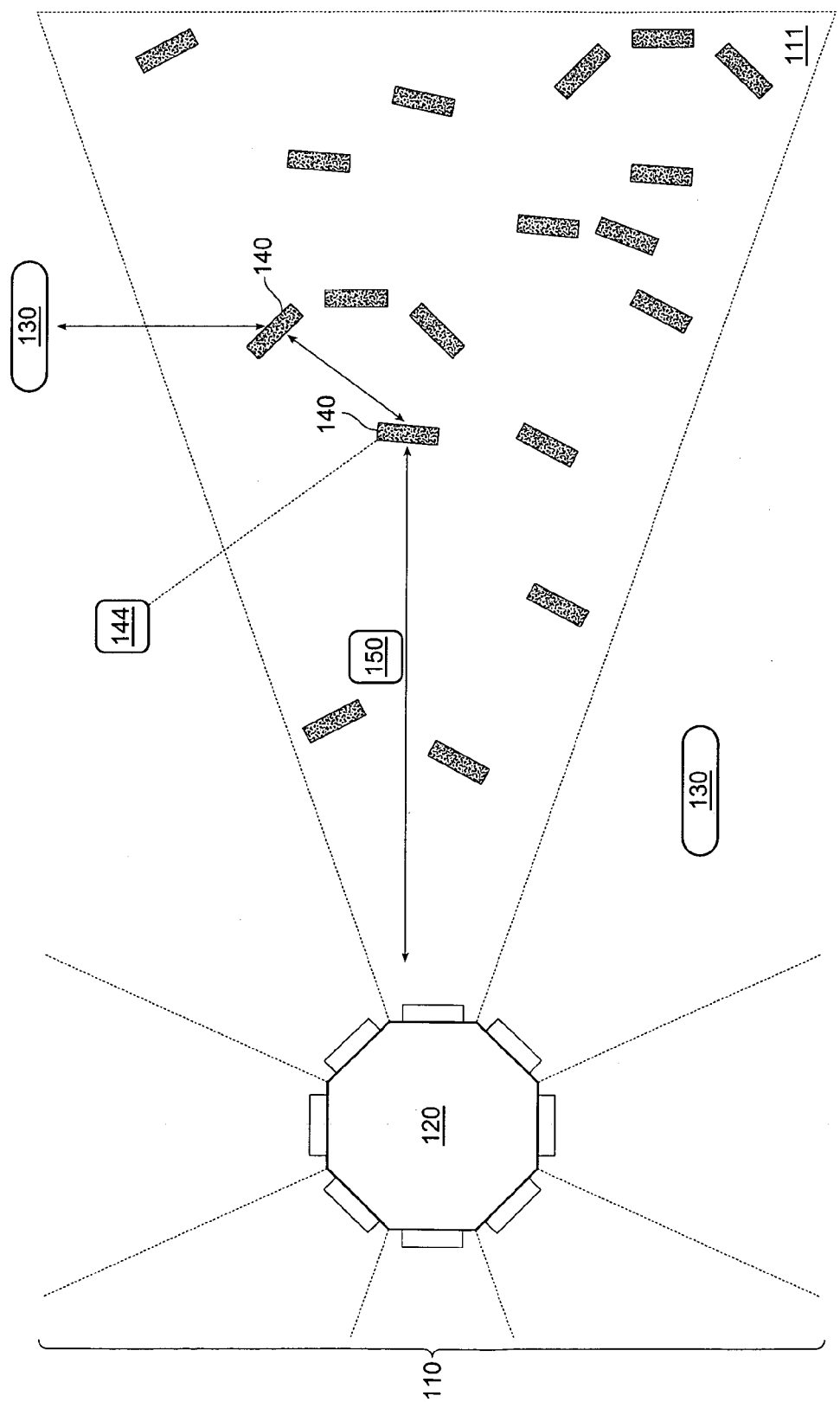
FIG. 4 shows a fourth block diagram of a system for wireless communication using robust topology.

FIG. 4 shows a fourth block diagram of a system for wireless communication using robust topology.

Similar to the third block diagram shown in FIG. 3, in a fourth block diagram shown in FIG. 4, each access point 140 includes a routing or switching devices 143 operative within a sector 111 or within a cell 110.

Similar to access points 140 including routing or switching devices 143 that route or switch packets 150 directly to destination customer premises equipment 130, each packet 150 sent from the base station controller 120 to the customer premises equipment 130 can be sent line-of-sight to an access point 140, rather than line-of-sight from the base station controller 120 to the customer premises equipment 130. At the access point 140, the packet 150 is received, routed (for example, the destination customer premises equipment 130 is determined and the packet 150 is resent line-of-sight to a second access point 140), and resent from the access point 140 to that second access point 140. From the second access point 140, the packet 150 is again received, routed (for example, the destination customer premises equipment 130 is determined and the packet 150 is resent line-of-sight to the destination customer premises equipment 130), so that the packet 150 reaches the customer premises equipment 130 in better form than using a non-routed path between the base station controller 120 and the customer premises equipment 130.

Similarly, access points 140 using routing or switching devices 143 can also be used for sending packets from the customer premises equipment 130 to the base station controller 120, by way of intermediate access points 140 (whether including routing or switching devices 143 or not).

Access Points 5

Figure 5:
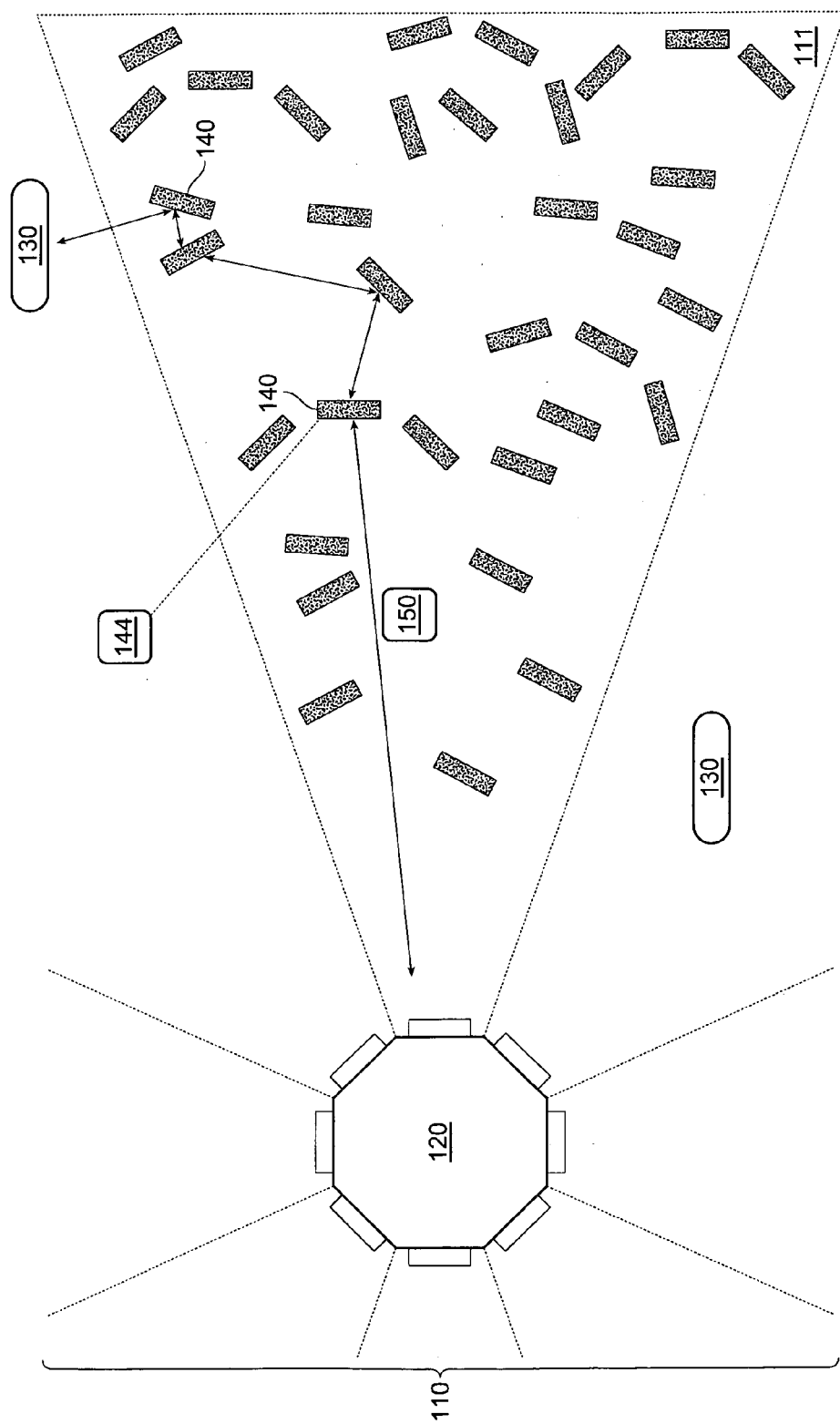
FIG. 5 shows a fifth block diagram of a system for wireless communication using robust topology.

FIG. 5 shows a fifth block diagram of a system for wireless communication using robust topology.

Similar to the third block diagram shown in FIG. 3, and similar to the fourth block diagram shown in FIG. 4, in a fifth block diagram shown in FIG. 5, each access point 140 includes a routing or switching devices 143 operative within a sector 111 or within a cell 110.

Similar to access points 140 described above, those access points 140 including routing or switching devices 143 can route or switch packets 150 among themselves, so as to route or switch packets 150 from the base station controller 120 to a set of intermediate access points 140 to the customer premises equipment 130. Multi-hop routing of packets 150 is known in the art of communication networks.

At each access point 140, the packet 150 is received, routed, and resent from the access point 140 to a next hop. From the next hop, the process is repeated, until the packet 150 is sent line-of-sight to the customer premises equipment 130, and thus reaches the customer premises equipment 130 in better form than using a non-routed path between the base station controller 120 and the customer premises equipment 130.

In a preferred embodiment, each access point 140 includes a routing or switching device 143 capable of performing at least some of the following functions:

IP routing—routing or switching devices 143 can route packets 150 using IP layer routing or switching MAC routing—routing or switching devices 143 can route packets 150 using MAC layer routing or switching Re-Adaptation—routing or switching devices 143 can re-adapt packets 150, such as breaking packets 150 into smaller units and collecting smaller units into larger packets 150

Mini-Scheduler—routing or switching devices 143 can include a scheduling function for determining which packets 150 to give priority to in routing, re-adaptation, and resending Routing and switching devices 143 can also be configured so as to route or switch only within a single sector 111 within a cell 110, or to route or switch among multiple sectors 111 within a cell 110.

Access Points (Further Generality)

Those skilled in the art will recognize, after perusal of this application, that the architectures shown in the figures and described herein can be substantially generalized in several ways.

First, the addition of access points 140 within a cell 110 allows the base station controller 120 to add additional capacity for sending and receiving messages in conjunction with customer premises equipment 130. Thus, the set of access points 140 (using reflectors 141, repeaters 142, or routing or switching devices 143) can form a mesh network in which messages are routed between the base station controller 120 and customer premises equipment 130, using the set of access points 140 as a communication sub-network. The communication sub-network is thus simultaneously (1) a distributed network of intermediate nodes in a switching network, and (2) a centralized switching system under control of the base station controller 120. For example, the set of access points 140 each operate independently to perform routing and switching (possibly including other aspects of routing and switching, such as scheduling, quality of service guarantees, and flow management), while the base station controller 120 controls the PHY and MAC parameters (as shown in the Incorporated Disclosures) of each of the access points 140. The base station controller 120 can control each of the access points 140 separately, or can determine global parameters for use within a cell 110 or sector within a cell 110.

Second, each access point 140 can perform some or all of the functions of the base station controller 120, only limited to a portion of the cell 110. Thus, within a single sector within a single cell 110, the base station controller 120 and the set of access points 140 within that sector can cooperate to control traffic, so as to form a micro-cell within the cell 110. There is no particular requirement that any one micro-cell must be entirely within a single sector; micro-cells can span portions of multiple sectors or even portions of multiple cells 110. This also allows the base station controller 120 and the set of access points 140 to cooperatively maintain a multi-tier cellular architecture, with each micro-cell each controlled by an associated access point 140 and cells 110 including multiple micro-cells controlled by the base station controller 120.

Third, the addition of access points 140 within a cell 110 allows the base station controller 120 to add incremental additional capacity for sending and receiving messages and controlling the flow of messages within the cell 110. This enables the wireless system to grow in incremental steps, rather than large jumps in capacity, so as to create a "pay as you grow" deployable system. There is no particular requirement that the addition of access points 140 within a cell 110 requires the base station controller 120 itself to have additional capacity or functionality.

Fourth, there is no particular requirement that communication paths must be line of sight. Although in a preferred embodiment, most electromagnetic communication is line of sight, it is also possible for electromagnetic communication to include non line of sight components. A first example is differential penetration of barriers at different frequencies, such as buildings which pose a substantial reflection problem at a first frequency f1 but do not pose a substantial reflection problem at a second frequency f2. A second example is refraction of electromagnetic communication at known frequencies so as to obtain a non line of sight path. A third example is multipath addition resulting in communication between a first peak and a second peak in a communication standing wave. Those skilled in the art will recognize, after perusal of this application and the Incorporated Disclosures, that the base station controller 120 can manipulate parameters for the PHY, MAC and other layers to improve communication with access points 140 even under non line of sight conditions.

Fifth, the addition of access points 140 within a cell 110 presents a new opportunity for the base station controller 120 to control quality of service (QOS) and flow management within the cell 110. The base station controller 120 can thus control QOS between the base station controller 120 and customer premises equipment 130, either by (1) controlling specific PHY and MAC parameters for direct communication, (2) controlling specific PHY and MAC parameters for indirect communication using access points 140, or (3) selection of the number and location of access points 140 for indirect communication with customer premises equipment 130. Thus, for example, the base station controller 120 can choose, instead of a shortest-path strategy, a best-QOS strategy for routing messages using access points 140 to customer premises equipment 130.

Sixth, those skilled in the art will recognize, after perusal of this application and the Incorporated Disclosures, that the addition of access points 140 within a cell 110 makes it easier to deploy the wireless communication system. The base station controller 120 can be located in many additional locations, as can customer premises equipment 130. Moreover, since the base station controller 120 controls the PHY, MAC and other parameters, it is easier to deploy the wireless communication system and obtain acceptable communication between the base station controller 120 and customer premises equipment 130 using access points 140.

Sixth, those skilled in the art will recognize, after perusal of this application and the Incorporated Disclosures, that the addition of access points 140 within a cell 110 makes it easier to use the wireless communication system in conjunction with requirements for QOS and flow management. Since the base station controller 120 controls the PHY, MAC and other parameters, it is easier to manage the wireless communication system for QOS and flow management and obtain acceptable communication between the base station controller 120 and customer premises equipment 130 using access points 140.

Generality of the Invention

The invention has general applicability to various fields of use, not necessarily related to the services described above. For example, these fields of use can include one or more of, or some combination of, the following:

- The invention is applicable to other forms of wireless communication, such as code division multiple access (CDMA, also known as spread spectrum communication), frequency division multiple access (FDMA), space division multiple access (SDMA), time division multiple access (TDMA), and combinations thereof;
- The invention is applicable to wireline (that is, non-wireless) communication, in which now can be achieved from dynamically adjusting communication parameters, such as physical parameters or MAC parameters. For example, the invention can be generalized to wireline communication using modems in which equalization parameters are to be dynamically adjusted.
- The invention is applicable to other wireless communication systems, such as satellite communication systems and (microwave tower or other) point to point transmission systems.
- The invention is applicable to both fixed wireless communication systems, in which customer premises equipment do not move relative to the base station controller 120, and to mobile wireless communication systems, and which customer premises equipment move substantially relative to the base station controller 120.

Other and further applications of the invention in its most general form, will be clear to those skilled in the art after perusal of this application, and are within the scope and spirit of the invention.

ALTERNATIVE EMBODIMENT

Although preferred embodiments are disclosed herein, many variations are possible which remain within the concept, scope, and spirit of the invention, and these variations would become clear to those skilled in the art after perusal of this application.

The invention claimed is:

1. A method of controlling communication between a base station controller and customer premises equipment, comprising steps of:
   selecting, by said base station controller, one or more access points between said base station controller and said customer premises equipment for sending a message;
   controlling, by said base station controller, physical parameters and media access control parameters for said one or more access points;
   controlling, by said one or more access points, routing and switching of said message to said customer premises equipment, wherein said routing and switching by an access point includes said access point determining that said customer premises equipment is a destination for said message; and
   sending said message through said one or more access points from said base station controller to said customer premises equipment.

2. A method as in claim 1, further comprising the step of controlling, by said base station controller, quality of service parameters for communication between said base station controller and said access points.

3. A method as in claim 1, further comprising the step of controlling, by said access points, quality of service parameters for communication between said access points and said customer premises equipment.

4. A method as in claim 1, wherein said access points include one or more reflectors, each reflector reflecting an electromagnetic signal carrying said message from a first path to a second path.

5. A method as in claim 1, wherein said access points include one or more repeaters.

6. A method as in claim 1, wherein said access points include one or more routers or switching devices.

7. A method as in claim 1, wherein each of said access points includes one or more reflectors, repeaters, or routers or switching devices.

8. A method as in claim 1, wherein said step of sending is at least partially wireless.

9. A method as in claim 1, further comprising the step of controlling, by said base station controller or said access points, scheduling for communication between said base station controller and said access points.

10. A base station controller capable of controlling communication between a base station controller and customer premises equipment, comprising:
    wireless communication equipment including at least an antenna and a transmitter and receiver; and
    a processor that controls the wireless communication equipment, said processor programmed to perform instructions comprising steps of (a) selecting one or more access points between said base station controller and said customer premises equipment for sending a message, (b) controlling physical parameters and media access control parameters for said one or more access points, and (c) sending said message through said one or more access points to said customer premises equipment, wherein said one or more access points control routing and switching of said message to said customer premises equipment; and wherein said routing and switching by an access point includes said access point determining that said customer premises equipment is a destination for said message.

11. A base station controller as in claim 10, wherein said instructions further comprise the step of controlling scheduling for communication between said base station controller and said access points.

12. A base station controller as in claim 10, wherein said instructions further comprise the step of controlling quality of service parameters for communication between said base station controller and said access points.

13. A base station controller as in claim 10, wherein said instructions permit said access points to control scheduling for communication between said access points and said customer premises equipment.

14. A base station controller as in claim 10, wherein said instructions permit said access points to control quality of service parameters for communication between said access points and said customer premises equipment.

15. A memory storing information including instructions, the instructions executable by a processor of a base station controller to control communication between a base station controller and customer premises equipment, wherein the instructions comprise steps of:
    selecting one or more access points between said base station controller and said customer premises equipment for sending a message;
    controlling physical parameters and media access control parameters for said one or more access points; and
    sending said message through said one or more access points to said customer premises equipment;
    wherein said one or more access points control routing and switching of said message to or from said customer premises equipment; and
    wherein said routing and switching by an access point includes said access point determining that said customer premises equipment is a destination for said message.

16. A memory as in claim 15, wherein said instructions further comprise the step of controlling scheduling for communication between said base station controller and said access points.

17. A memory as in claim 15, wherein said instructions further comprise the step of controlling quality of service parameters for communication between said base station controller and said access points.

18. A memory as in claim 15, wherein said instructions permit said access points to control scheduling for communication between said access points and id customer premises equipment.

19. A memory as in claim 15, wherein said instructions permit said access points to control quality of service parameters for communication between said access points and said customer premises equipment.

* * * * *